3,525,418
NOISE SUPPRESSION SYSTEM
Cloyd D. Smith, Pacific Palisades, and James H. Schmidt, Berkeley, Calif., assignors to General Acoustics Corporation, Los Angeles, Calif., a corporation of California
Filed Oct. 11, 1968, Ser. No. 766,910
Int. Cl. F01n 1/14, 3/04
U.S. Cl. 181—35            10 Claims

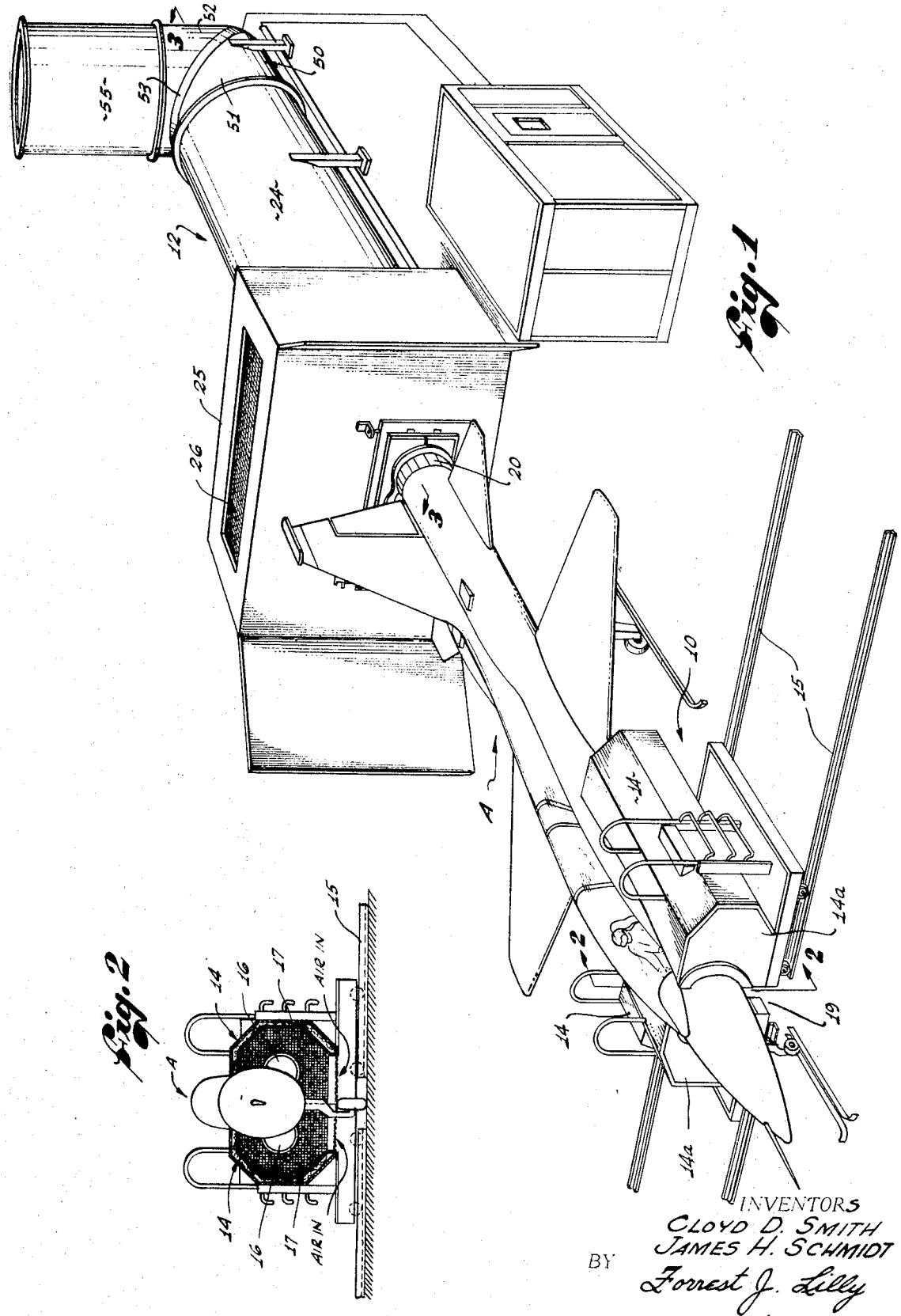

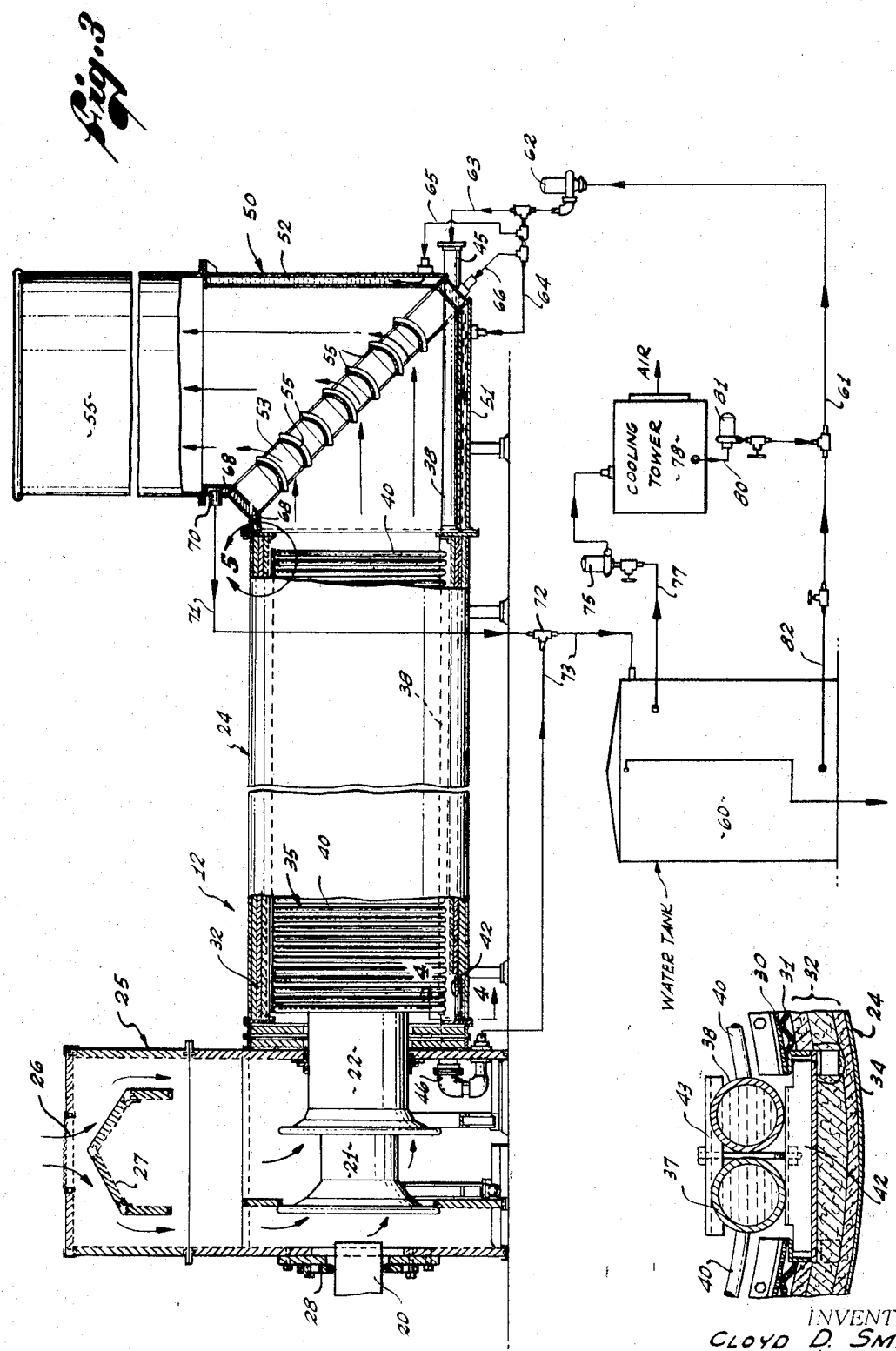

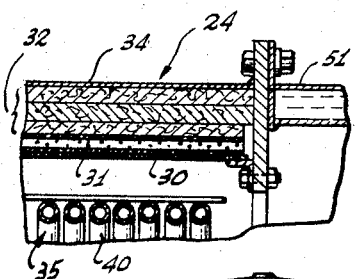
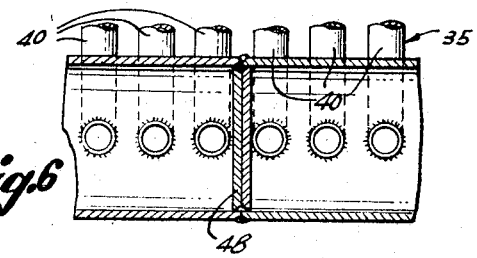
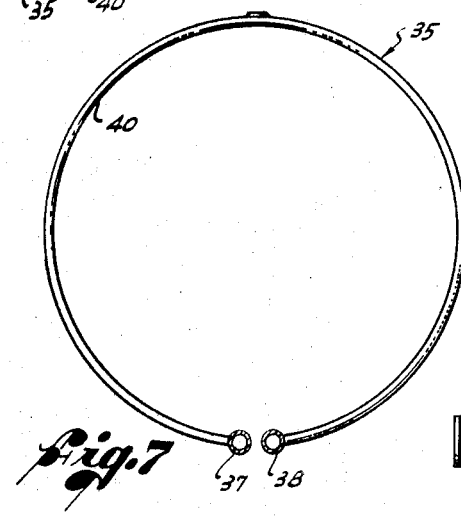
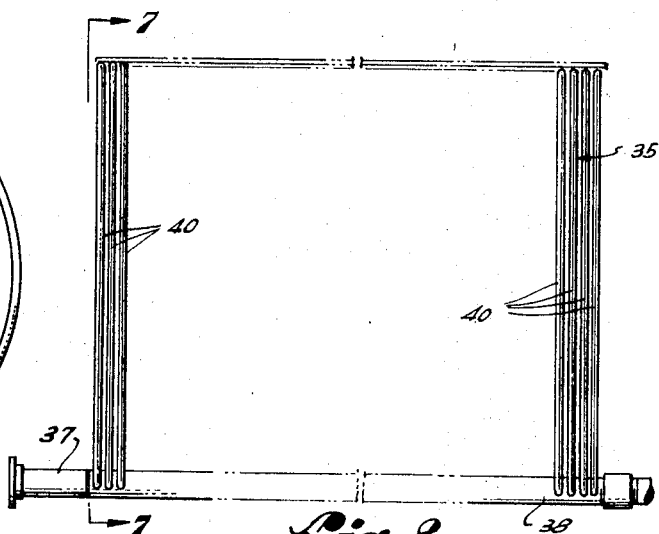
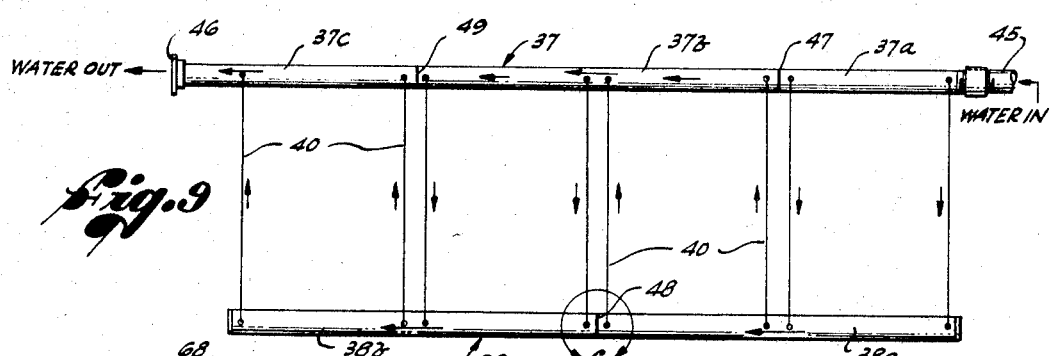
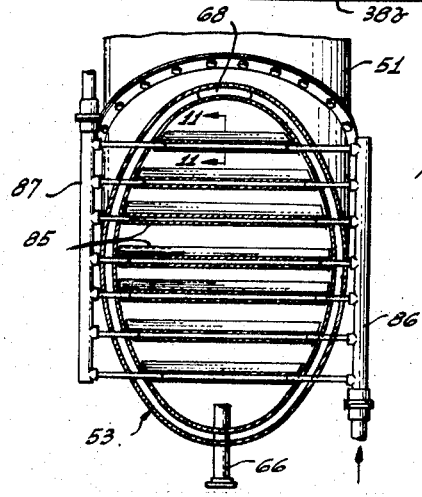
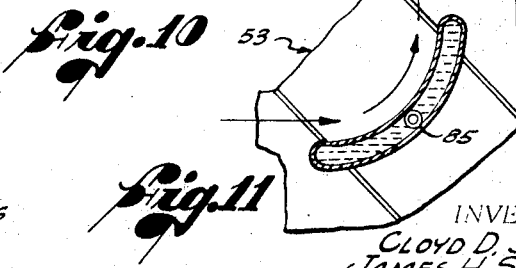
INVENTORS
CLOYD D. SMITH
JAMES H. SCHMIDT
BY Forrest J. Lilly
ATTORNEY United States Patent Office 3,525,418
Patented Aug. 25, 1970

ABSTRACT OF THE DISCLOSURE

A noise suppression system for testing jet engines includes both an intake silencer and an exhaust noise suppressor. The latter is designed to remove energy from the exhaust gases by cooling them quickly and to this end provides an acoustical tubular shell with a removable liner which provides a water-cooled coil for absorbing thermal energy from the gases. The coil is part of a water circulation system which includes a cooling tower or other means through which the water is circulated to cool it, thereby permitting operation of the system over an extended period of time.

BACKGROUND OF THE INVENTION

The present invention relates generally to means for absorbing quickly the energy of a high velocity stream of gases to reduce the sound produced thereby, and is more particularly concerned with a structure designed to absorb and dissipate noise created during testing of jet engines in aircraft and the like.

The reactive propulsion engines, such as the gas turbine or the ram jet, produce a large amount of noise, both at intake and exhaust, as a result of the high velocities at which air or exhaust gases are moving. The frequency range of the noises produced by operating engines of this class includes not only the entire audible range but frequencies which are below and above the audible range. Because of the high intensity of the noise produced by these engines, these noises have definitely injurious physiological effects on nearby personnel; and this has led to the problem of protecting personnel operating in the immediate vicinity of an engine. Running engines during ground testing and other ground operations create serious occupational hazards for test personnel.

Although the hazards to workmen in the immediate vicinity can be somewhat reduced by devices such as ear plugs, it still becomes necessary to suppress the noise produced by engines of this class in order to eliminate a nuisance which is objectionable to personnel in the vicinity of a test stand, and especially nearby residents. Naturally, the problem is increased by the continuing increase in the power of individual engines.

Reduction of the noise produced by an engine to a tolerable level can be accomplished by absorbing the sonic energy. More particularly, this is accomplished by reducing as rapidly as possible the energy content of the exhaust stream and then discharging the exhaust gases into the atmosphere at a greatly reduced velocity as compared with the velocity at which they issue from the jet engine exhaust.

An initial stage of cooling can be accomplished by adding atmospheric air to the exhaust stream, but this alone is not sufficient because after-burner engine temperatures are 3000° F. and above. Additional cooling and energy absorption is necessary and has been accomplished in known types of sound suppressing systems by spraying water directly into the stream of exhaust gases after the initial cooling by the introduction of secondary air. Maximum cooling is desired to lengthen as much as possible the life of the acoustical shell.

The use of water sprays is objectionable for various reasons. The moisture in the exhaust gases causes corrosion because it produces an acid base mixture. Also, droplets of water settle on nearby objects, often causing substantial damage through corrosion to aircraft and other operating equipment, thereby shortening the useful life of the equipment. Also, a very substantial amount of water is consumed; and this presents a major problem in areas where water supplies are limited.

Thus, it is a general object of the present invention to devise a novel means for the suppression of noise from the exhaust of a jet engine, or the like.

More particularly, it is an object of the present invention to provide a noise suppression system for the exhaust of a jet engine which cools the exhaust stream with increased effectiveness and is capable of continued operation over an extended period of time, but without injecting the water directly into the exhaust gas stream.

BRIEF DESCRIPTION OF THE DRAWINGS

The invention will be more fully understood by reference to the following description and to the annexed drawing, in which:

FIG. 1 is a perspective of an improved noise suppression system embodying the present invention, illustrating its application to modern jet aircraft;

FIG. 2 is a vertical section through the intake silencer, as on line 2—2 of FIG. 1;

FIG. 3 is a combined vertical median section and elevation through the exhaust noise suppressor, with the water circulation system shown diagrammatically in connection therewith;

FIG. 4 is an enlarged vertical fragmentary section on line 4—4 of FIG. 3;

FIG. 5 is an enlarged detail in section of the area within the circle 5 of FIG. 3;

FIG. 6 is an enlarged detail in section of the construction of the manifold within the circled area 6 of FIG. 9;

FIG. 7 is a combined end elevation and section of the water-cooled coil taken on line 7—7 of FIG. 8;

FIG. 8 is a side elevation of the water cooling coil of the exhaust suppressor;

FIG. 9 is a flow diagram of the cooling coil of FIG. 8;

FIG. 10 is a section through the elbow illustrating a modified form of turning vanes; and FIG. 11 is a section on line 11—11 of FIG. 10.

DESCRIPTION OF A PREFERRED EMBODIMENT

Referring now to the drawing, and more particularly to FIG. 1, there is shown therein a jet aircraft A which has been brought into a position such that the noise suppressor system can be applied to the aircraft. Generally speaking, the system comprises two main units; An inlet silencer indicated generally at 10 and the exhaust noise suppressor indicated generally at 12.

The inlet silencer consists of a pair of side shields 14 mounted upon tracks 15 which enable the shields to be brought into contact with the aircraft at opposite sides thereof. The front and sidewalls of the shields are of acoustic construction and are designed to absorb the sound generated at the inlet end of the air ducts 16 leading to the engines of the aircraft. Any of various well known wall constructions may be used for this purpose.

The main air inlet in the silencer 10 for the engines is at the bottom of the two shields 14. As may be seen in FIG. 2, the rear end of each shield is provided with a screened opening 17 designed to permit a large volume of air to enter the space enclosed by shields 14 but to remove any harmful particles of foreign matter. The shields are also open underneath the fuselage of the aircraft and screening at 18 is across this air inlet opening. A minor air inlet is also preferably provided at the forward end of the two shields, as may be seen in FIG. 1, by leaving a space 19 between the two shields underneath the nose of the aircraft. The side and front walls of the shields 14 are of acoustic construction so that the open ends of air ducts 16 are substantially enclosed, except as necessary to admit air for the engines.

The front walls 14a of the shields 14 are in effect targets against which sound generated at air intakes 16 impinges. By making these walls of acoustic construction, much of the intake-generated sound, especially objectionable high frequencies, is absorbed. When one engine is running, the opposite intake unit acts as an additional acoustical absorptive chamber.

The exhaust noise suppressor indicated generally at 12 receives the high velocity stream of exhaust gases from the jet engine or engines in the tail of the aircraft. The tail-pipe or exhaust duct of the aircraft is indicated at 20 in FIG. 3 which shows the exhaust noise suppressor in detail.

The stream of hot exhaust gases leaving tailpipe 20 enters augmenter tube 21 which is axially aligned with tailpipe 20. The tailpipe is smaller in diameter and may be spaced slightly from the entrance to tube 21 so that surrounding air is drawn into the inlet end of tube 21 by injector action from the exhaust stream.

It is preferable to add to tube 21 a second tube 22 of larger diameter than tube 21 that provides a second inlet for surrounding air, also by injector action. Thus, there is a mixture of the exhaust gases and secondary air passing through the augmenter assembly comprising tubes 21 and 22. The secondary air cools the high temperature exhaust gases and the mixture is discharged from the end of tube 22 into tubular shell 24 which is a means for obtaining further cooling of the gas stream.

The inlet end of the augmenter assembly is located within enclosure 25 which traps and absorbs sound energy of the exhaust stream which escapes at the inlet of the augmenter assembly. Enclosure 25 has an upwardly facing air inlet 26 for secondary air, the air passing down around an internal baffle 27 and downwardly within enclosure 25 to the inlet ends of the two tubes 21 and 22. The escape of sound at the point of entry of tailpipe into enclosure 25 is reduced by seal 28. Seal 28 is divided horizontally into two halves which can be moved toward each other and into engagement with tailpipe 20 of the aircraft, the edges of the seal being softly padded to conform to the surface of the tailpipe and also to avoid injury thereto. The two halves of seal 22 are slidably mounted externally on the front wall of enclosure 25. They are also spring loaded to allow for vertical movement of the tailpipe during various power settings.

From augmenter tube 22, the exhaust gases, now partially cooled, enter the cooling chamber within shell 24. Shell 24 is preferably circular in cross section and has an annular wall of acoustical material which provides a high degree of energy and noise absorption. While the wall may have any desired construction and thickness, the preferred construction is illustrated in FIGS. 4 and 5. In these figures, it will be seen that the innermost element of the wall is a perforated sheet 30. Outwardly of this sheet is a corrugated sheet 31 which is also perforated metal. Outwardly of corrugated sheet 31 is a zone 32 which is filled with fibrous high temperature sound absorbent material, such as glass fibers, or rock wool. The zone 32 is preferably composed of a plurality of layers of fibrous material of outwardly increasing density in order to render the wall most effective over a wide range of sound frequencies. On the outside, the wall is covered with a solid metal plate 34. All of the materials for the wall of shell 24 are selected to withstand the elevated temperatures encountered.

Inside shell 24 is a gas cooling coil, indicated generally at 35, which serves as a liner for shell 24 and defines the main passage for exhaust gases through the cooling chamber within the coil. The cooling coil is shown in detail in FIGS. 7 and 8, while water circulation and the connections between the various elements of the coil are shown diagrammatically in FIG. 9.

The gas cooling means, identified generally at 35, and referred to herein as the cooling coil, comprises a longitudinally extending foundation means which, for reasons that will become apparent, is designed to operate in the manner of a skid, and upon which a plurality of individual annular pipes or turns of the cooling coil are supported. Actually, it is preferred to take advantage of the presence of the structural members at the bottom of the cooling coil forming the base elements to utilize these members as manifold means to distribute the cooling water to the several individual coils. These considerations lead to the preferred design, although it will be understood that the invention is not necessarily limited to all of the details of this preferred embodiment of the coil.

As shown in FIGS. 7 and 8, at the bottom of the cooling coil 35, there is a pair of longitudinally extending pipes 37 and 38. Although these pipes are in effect segmented in order to function as manifold means as will be described, the successive segments in each pipe are axially aligned and connected together to form a structurally unitary member in order that the two pipes 37 and 38 provide the foundation or base on which the coil as a whole is supported. Connected to the two pipes 37 and 38 are a plurality of small annular tubes or hooplike pipes 40, the diameter of these turns being such that coil assembly 35 is received within shell 24 with some clearance between the pipes 40 of coil 35 and inner wall 30 of the shell, except at the bottom of the shell where longitudinal members 37 and 38 contact the shell.

The individual pipes 40 or turns of the cooling coil are preferably spaced from each other and also from the inside surface of the wall of shell 24, as shown in FIG. 5. This permits more complete exposure of the exterior surface of tubes 40 to the heated gases passing through the cooling chamber, thereby increasing the rate of heat exchange between the gases and the pipes 40. Also, the spacing of the pipes from the shell walls cools the gasese that reach the shell wall and thus reduces the maximum gas temperatures to which the shell is exposed. This temperature reduction, as compared to a shell with water sprays and no coil 35, results in a greatly extended life of the equipment. Based on observations to date, it appears that the useful life of a suppressor shell may be increased by a factor of as much as five. It has also been found that the spacing of the cooling tubes, in combination with the absorptive liner, results in a modified resonating chamber—resulting in an increase in low frequency attenuation.

Incorporated in the wall of shell 24 are a plurality of support pads 42, as shown in FIG. 4. These are located at the bottom of the shell and are spaced at suitable intervals longitudinally of the shell to support coil 35 with the two pipes 37 and 38 resting upon pads 42. In position within this shell, the coil assembly is held in place by clamps 43 which can be tightened down against pipes 37 and 38.

However, when clamps 43 are loosened and the inlet and outlet water connections to the coil are disconnected, coil 35 as a whole can slide into and out of shell 24; and it is to facilitate this movement of the coil as a whole that the two pipes 37 and 38 are made of structurally continuous members. Alternatively, pads 42 can be replaced by a single continuous support extending lengthwise of the shell.

In order to obtain manufacturing economies of production and for obvious engineering reasons, cooling coil 25 is made of the same diameter throughout its length, as is also tubular shell 24. However, it will be understood that the invention is not necessarily limited to this design.

Water flow within coil 35 is shown schematically in FIG. 9. Supply line 45 is connected to one end of pipe 37 while outlet 46 is at the opposite end of the same manifold pipe. Rapir heat transfer from the gases to the water within the tubes 40 requires a large surface area in contact with the gases. This can be obtained by a large number of tubes 40 of relatively small diameter, as opposed to smaller number of tubes of larger diameter. At the same time, reduction in the diameter of the tubes increases the resistance to water flow and reduces the quantity of water flowing through a tube past a given point per unit time. For this reason, the coil is not made up of a single length of tubing arranged helically but instead the individual pipes 40 each extend for a single turn and extend between one manifold section in pipe 37 and another manifold section in pipe 38; and the individual pipes 40 are arranged in a number of groups in prallel with water flow in one direction within each group.

Assuming for purposes of illustration that there are four groups of pipes 40, each occupying approximately one-fourth of the length of coil 35, water enters pipe 37, through supply line 45. At approximately the quarter point of the coil, barrier 47 closes manifold pipe 37 so that flow from right to left in pipe 37 is limited to initial manifold section 37a. All of the annular pipes 40 connected to manifold 37a are thus supplied water which flows through them to the initial manifold section 38a of the opposite manifold pipe 38. Water then flows to the left within manifold section 38a to the second group of pipes 40, flow being limited in pipe 38 by barrier 48. As a result, in the second group of pipes 40, flow is from manifold 38 back to manifold 37. Flow entering the second manifold segment 37b now flows within that segment to a point where flow is limited by a further barrier 49 and water flows through the third group of pipes 40 from manifold 37 back to the second segment 38b of manifold 38. Continuing this zig-zag pattern of flow between manifolds, water leaves the second manifold section 38b to return to the final segment 37c of manifold 37 and then out of the coil at outlet 46.

When pipes 40 are divided into an even number of groups, here there are four, the water outlet line will be connected to the same manifold as the supply. Were the pipes 40 arranged in three groups, then water discharge line 46 would be connected to the end of manifold segment 38b. From inspection of FIG. 9, it will be seen that some of the pipe segments are longer than others, and each segment may be regarded by itself as a manifold. The first and last segments through which the water flows are connected to only one group of pipes 40 and are consequently shorter than the intervening segments of the manifold which are each connected to two groups of pipes 40.

From the standpoint of water flow and distribution, each of the segments of the individual manifolds 37 and 38 is a separate manifold as far as the flow pattern is concerned, distributing water to and/or receiving water from a group of pipes, there being preferably an equal number of pipes 40 in each group. However, pipes 37 and 38 are each referred to as a manifold since they have structural integrity which permits them to operate as support members for the coil as a whole, as described above.

Thus, it will be seen that viewed from one standpoint each of manifolds 37 and 38 may be regarded as a continuous pipe with plugs at intervals to localize water flow within the pipes. From another viewpoint, each segment of these two members may be viewed as a complete manifold unit adjacent another similar unit. This arises from the dual functions of the pipes 37 and 38, as explained.

At the end of shell 24 opposite augmenter tubes 21 and 22, the now considerably cooled gases are discharged. The gases are still hot enough that discharge in a horizontal direction is undesirable; and, consequently, it is preferred to connect the end of the shell to an elbow structure 50 illustrated in FIG. 3 as comprising three principal sections. The elbow includes two sections 51 and 52, each of which has an end face with a connecting flange lying in a radial plane normal to the section axis and at the opposite end a face lying in a plane at 45° to the section axis. These latter two faces are each connected to intermediate section 53 which is elliptical in outline and which carries internally a plurality of gas turning vanes 55. The three sections of the elbow are conveniently welded together to form a unitary structure, and the elbow is connected to shell 24 in such a position that gases discharged are directed upwardly into the atmosphere.

If desired, the gas discharged from elbow section 52 can be carried further upwardly into the air by a stack 55 on the discharge end of the elbow.

Additional cooling of the gas can be effected and the walls of the elbow can be protected against excessive heat by providing cooling in the form of a water jacket for each of sections 51, 52, and 53 of the elbow, as shown particularly in FIG. 3. In each section, the jacket is formed by providing a double wall for the elbow with space between the two walls to receive water which circulates within the space.

To permit operation of the exhaust noise suppressor over an extended period of time, means are provided for cooling and circulating water through coil 35 and the elbow sections. The circulation system is illustrated diagrammatically in FIG. 3. This circulation system consists of a reservoir or surge tank 60 from which water may be taken through lines 61 and pumped through coil 35 and the jacket on the elbow structure by main circulation pump 62. The discharge side of pump 62 is connected by line 63 directly to supply line 45 to cooling coil 35. Branch lines 64 and 65 each supply water to one of the water jackets of elbow sections 51 and 52, respectively, the connections to the water jackets being at a low point on the jackets and remote from the outlet, to be mentioned. Another branch supply line 66 supplies water to the jacket of intermediate elbow section 53.

The three separate water jackets on the three elbow sections 51, 52, and 53 are placed in communication with each other near outlet 70 by a pair of openings 68 in the interconnecting flanges. As a consequence, the single discharge line 71 connected to outlet 70 receives heated water from all three jacket sections. Line 71 is connected at 72 to discharge line 73 which is connected to outlet 46 from coil 35. Line 73 returns the heated water from the noise suppressor to reservoir 60.

In order to cool the water after return to tank 60, it is withdrawn from the tank by pump 75 through line 77 which delivers the discharge from pump 75 to cooling tower 78. From the sump at the bottom of the cooling tower, cooled water is withdrawn through line 80 by pump 81; and the discharge side of pump 81 is connected to line 61 so that the water cooled in the tower can flow directly to the intake side of main circulating pump 62 without necessarily returning to the storage tank, although the storage tank is, in effect, continuously connected to the circulating pump in order that there is always an adequate supply of water available to pump 62. A valved by-pass line 82 may be used to return cooled water to tank 60 if circulation through the suppressor is not needed.

FIGS. 10 and 11 illustrate a variational embodiment of the invention in which additional cooling of the exhaust gas stream is achieved by water cooling of the turning vanes in the elbow. The outer wall of elbow section 53 is water-jacketed as described. Turning vanes 85 are hollow to permit cooling water to pass through them. The vanes extend outwardly through the water-jacketed wall to connect to an inlet manifold 86 and an outlet manifold 87.

In turn, these two manifolds are connected to the closed circuit for circulation of cooling water.

From the foregoing description, it will be realized that various changes in the detailed construction and arrangement of the noise suppressor system may occur to persons skilled in the art without departing from the spirit and scope of the present invention. Accordingly, the foregoing description is considered as being illustrative of, rather than limitative upon, the invention disclosed herein.

We claim:

1. A jet engine noise suppressor system comprising:
   a tubular shell having an acoustical energy absorbing wall and adapted to receive at one end the exhaust stream from a jet engine;
   a water cooler liner inside the shell and surrounding and in contact with the stream of heated exhaust gases passing through the shell;
   water cooling means externally of the shell;
   and closed circuit means circulating cooling water through the liner and the cooling means in series.

2. A jet engine noise suppressor according to claim 1 in which the water cooled liner rests on pads attached to the shell and is removable as a unit from the shell by relative axial movement of the liner and shell.

3. A jet engine noise suppressor according to claim 1 in which the liner comprises:
   a pair of parallel manifolds closely adjacent to each other;
   and a plurality of pipes extending around the interior of the shell between the two manifolds, said pipes being substantially parallel to each other.

4. A jet engine noise suppressor according to claim 3 in which the two manifolds extend axially of the shell at the bottom of the liner and rest on pads attached to the shell, the liner being slidable on the pads for axial movement relative to the shell.

5. A jet engine noise suppressor according to claim 3 in which each manifold has in a plurality of separate segments axially aligned and water flows from one manifold in one direction in a group of successive pipes to the other manifold and returns by flow in the opposite direction in an adjoining group of successive pipes.

6. A jet engine noise suppressor according to claim 3 in which pipes of the liner are spaced from the shell wall and from each other to provide for circulation of exhaust gases around the individual pipes and between the liner and the shell wall.

7. A jet engine noise suppressor according to claim 1 which also comprises an elbow at the outlet end of the tubular shell, said elbow including
   a pair of end sections with miter-cut end faces;
   and an intervening elliptical section joined to the miter-cut faces of the two end sections;
      the elliptical section having turning vanes mounted therein for changing direction of gas flow;
      and all three of said sections each having a water jacket connected to said closed circuit means.

8. A jet engine noise suppressor system accordance to claim 7 in which the turning blades are hollow and which includes connections to the closed circuit means to circulate cooling water through the vanes.

9. A jet engine noise suppressor according to claim 1 that also includes air injector means at said one end of the shell introducing secondary air into the shell to mix with the exhaust stream.

10. A jet engine noise suppressor system according to claim 1 which also includes
   an engine intake silencer comprising a pair of shields movable into engagement with an aircraft fuselage, each shield having front and side walls of acoustical energy absorbing construction forward of the engine intake.

References Cited

UNITED STATES PATENTS

| | | |
|---|---|---|
| 2,685,936 | 8/1954 | Brenneman et al. |
| 2,810,449 | 10/1957 | Coleman. |
| 2,935,841 | 5/1960 | Myers et al. |
| 2,937,494 | 5/1960 | Johnson _____ 60—39.66 XR |
| 2,940,537 | 6/1960 | Smith et al. |
| 3,052,431 | 9/1962 | Compton _____ 60—39.66 XR |
| 3,208,552 | 9/1965 | Seifert. |
| 3,359,737 | 12/1967 | Lewis. |

FOREIGN PATENTS 791,112  2/1958  Great Britain.

ROBERT S. WARD, Jr., Primary Examiner

U.S. Cl. X.R.

60—31, 39.66; 181—51